(12) United States Patent
Koo et al.

(10) Patent No.: US 8,259,615 B2
(45) Date of Patent: Sep. 4, 2012

(54) METHOD, APPARATUS AND SYSTEM FOR DISPLAYING TOPOLOGY INFORMATION OF WIRELESS SENSOR NETWORK

(75) Inventors: Bon Hyun Koo, Suwon-si (KR); Wook Choi, Hwaseong-si (KR); Hyo Hyun Choi, Seoul (KR); Tae Shik Shon, Suwon-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 924 days.

(21) Appl. No.: 12/262,291

(22) Filed: Oct. 31, 2008

(65) Prior Publication Data
US 2010/0026686 A1 Feb. 4, 2010

(30) Foreign Application Priority Data
Oct. 31, 2007 (KR) .................. 10-2007-0110361

(51) Int. Cl.
*H04L 12/28* (2006.01)

(52) U.S. Cl. ........ 370/254; 370/252; 370/253; 370/255; 370/256

(58) Field of Classification Search .............. 370/252, 370/253, 254, 255, 256
See application file for complete search history.

(56) References Cited

U.S. PATENT DOCUMENTS

| | | | | |
|---|---|---|---|---|
| 6,347,336 | B1 * | 2/2002 | Song et al. ................. | 709/223 |
| 6,828,981 | B2 * | 12/2004 | Richardson .................. | 345/590 |
| 6,950,059 | B2 * | 9/2005 | Rapoport et al. ........ | 342/357.27 |
| 7,039,546 | B2 * | 5/2006 | Sawada et al. .............. | 702/150 |
| 7,209,468 | B2 * | 4/2007 | Twitchell, Jr. .............. | 370/338 |
| 7,266,781 | B1 * | 9/2007 | Burlowski .................. | 715/834 |
| 7,327,309 | B2 * | 2/2008 | Wimmer .................... | 342/185 |
| 7,373,612 | B2 * | 5/2008 | Risch et al. ................. | 715/850 |
| 7,522,174 | B2 * | 4/2009 | Yamamoto et al. .......... | 345/619 |
| 7,812,718 | B1 * | 10/2010 | Chan et al. ............... | 340/539.13 |
| 8,027,273 | B2 * | 9/2011 | Nguyen ..................... | 370/254 |
| 2002/0063801 | A1 * | 5/2002 | Richardson .................. | 348/589 |
| 2002/0183052 | A1 * | 12/2002 | Tachikawa .................. | 455/422 |
| 2004/0152420 | A1 * | 8/2004 | Redi et al. ................. | 455/67.11 |
| 2005/0243085 | A1 * | 11/2005 | Schechter et al. ........... | 345/419 |
| 2008/0151761 | A1 * | 6/2008 | Theisen et al. .............. | 370/241 |
| 2010/0172265 | A1 * | 7/2010 | Wheeler et al. .............. | 370/252 |

* cited by examiner

*Primary Examiner* — Ayaz Sheikh
*Assistant Examiner* — Andrew C Lee
(74) *Attorney, Agent, or Firm* — Cha & Reiter, LLC

(57) ABSTRACT

A method, apparatus and system for displaying topology information of a wireless sensor network includes a plurality of sensor nodes. The method typically includes: receiving node information collected and extracted from the sensor nodes; comparing the received node information with stored node information; computing, when the received node information is unequal to the stored node information, visualization information on a sensor node whose information is not present in the stored node information; and displaying the sensor nodes on concentric circles using the visualization information.

24 Claims, 11 Drawing Sheets

FIG. 3

```
CRC = 01 9C
============================
  Serial address = 7E 00
  msg type 7D
  CH_ID = 7D
  Data Length = 1A
  PAR_ID = 01 00
  ORG_ID = 34 5C
  sequence num. = 01  00
  hop count = 9B
  sug message type = 01
  <not used> = 9C  01
  <Parent node addr. = 9C  01
  Battery voltage = 9B 01 9B 01
  light<Raw> = 9B
  temp<Raw> = 01
  mag x = 01
  mag y = 9B
  accel x = 01
  accel y = 9B
  CRC = 01 9B
============================
  Serial address = 7E 00
  msg type = 0A
  CH_ID = 7D
  Data length = 1A
  PAR_ID = 01 00
  ORG_ID = 3E 5C
  sequence num. = 01 00
```

METHOD, APPARATUS AND SYSTEM FOR DISPLAYING TOPOLOGY INFORMATION OF WIRELESS SENSOR NETWORK

CLAIM OF PRIORITY

This application claims priority from an application entitled "METHOD, APPARATUS AND SYSTEM FOR DISPLAYING TOPOLOGY INFORMATION OF WIRELESS SENSOR NETWORK" filed in the Korean Intellectual Property Office on Oct. 31, 2007 and assigned Serial No. 2007-0110361, the contents of which are incorporated herein by reference in its entirety.

BACKGROUND OF THE INVENTION

1. Field of the Invention

The present invention relates generally to a wireless sensor network. More particularly, the present invention relates to a method, apparatus and system for displaying topology information of a wireless sensor network.

2. Description of the Related Art

A wireless sensor network includes sensor nodes and a sink node. Each sensor node comprises a miniaturized radio transceiver that can collect data through a sensor, process the collected data through a processor, and send the processed information. The sink node collects information from the sensor nodes and transfers the same to the outside. Wireless sensor networks are used primarily for remote information collection rather than for communication, and can be used to develop various applications with scientific, medical, military, and commercial purposes.

FIGS. 1A and 1B illustrate various topologies of sensor networks.

In FIG. 1A, a node Node1 is the head, center, of a cluster. The center is referred to as a cluster head. Nodes Node2 to Node6 are connected to the cluster head and lower-level nodes of the cluster head, and the node Node3 is a child node of the node Node2.

In FIG. 1B, a node Node1 is the cluster head, and nodes Node2 to Node7 are lower-level nodes of the cluster head. The nodes Node3 and Node4 are child nodes of the node Node2, and the node Node7 is a child node of the node Node6.

The nodes Node1, which are cluster heads, in FIGS. 1A and 1B can be sink nodes in their cluster networks. The sink node transfers data collected from the wireless sensor network to the outside, providing information regarding nodes of the wireless sensor network to the user. Thereto, sensor network observation software is normally used. The sensor network observation software graphically displays on the screen information collected by sensors regarding temperature, illumination, humidity, higher-level nodes, and cluster heads, using information from the sink node collecting data from the sensors interconnected through radio frequencies. The sensor network observation software collects and processes sensor node data from the sink node, and displays nodes in a single cluster through formation of connections between the nodes. For example, when sensor nodes equipped with an illumination sensor and humidity sensor send sensed data to the sink node, the sensor network observation software connected to the sink node processes and uses the sensed data.

However, to operate the sensor network observation software, the user has to specify locations of sensor nodes, and whenever a node is added, the user has to arrange the newly added node in the network. In the case of a ubiquitous sensor network including many nodes, the problem of duplicate visualization of nodes may occur with the increasing number of nodes, making it difficult to convey accurate information. Hence, it is necessary to develop a technique enabling efficient visualization of a large number of nodes.

SUMMARY OF THE INVENTION

The present invention provides a method, apparatus and system to efficiently visualize information regarding a large number of nodes in a sensor network having a variable topological structure.

In accordance with an exemplary embodiment of the present invention, there is provided a method of displaying topology information of a sensor network having a plurality of sensor nodes, typically including: receiving node information collected and extracted from the sensor nodes; comparing the received node information with stored node information; computing, when the received node information is unequal to the stored node information, visualization information on a sensor node whose information is not present in the stored node information; and displaying the sensor nodes on concentric circles using the visualization information.

In accordance with another exemplary embodiment of the present invention, there is provided an apparatus for displaying topology information of a sensor network having a plurality of sensor nodes, typically including: a wireless unit receiving node information collected and extracted from the sensor nodes; a checking unit comparing the received node information with stored node information; a calculating unit computing, when the received node information is unequal to the stored node information, visualization information on a sensor node whose information is not present in the stored node information; and a rendering unit displaying the sensor nodes on concentric circles using the visualization information.

In accordance with yet another exemplary embodiment of the present invention, there is provided a system of displaying topology information of a sensor network having a plurality of sensor nodes, typically including: a data collecting node collecting sensing data from the sensor nodes and transmitting the collected sensing data; a relay server receiving the sensing data from the data collecting node, extracting node information from the received sensing data, and broadcasting the extracted node information; and terminal devices, each receiving the node information broadcast from the relay server, computing visualization information of the sensor nodes, and displaying the sensor nodes on concentric circles using the visualization information.

Hereinabove, the exemplary features and advantages of the present invention are shown and described to assist those skilled in the art in understanding the present invention. The claimed invention is not limited to the illustrations and descriptions used herein to assist the artisan in understanding the invention. Other features and advantages constituting the subject matter of the present invention will be more apparent from the following detailed description.

In a feature of the present invention, topology information of sensor nodes can be automatically received to construct the topology without separate user control. The topology can be effectively constructed without node duplication through, for example, sectioning circumferences of concentric circles. Using the proposed software, the user can easily check and observe the topological state of a network as a whole.

BRIEF DESCRIPTION OF THE DRAWINGS

The objects, features and advantages of the present invention will be more apparent from the following detailed description in conjunction with the accompanying drawings, in which:

FIG. 3 illustrates exemplary message filtering by a relay server in accordance with the principles of the present invention;

DETAILED DESCRIPTION

Hereinafter, exemplary embodiments of the apparatus and system for displaying topology information of a wireless sensor network are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

Figure 2:
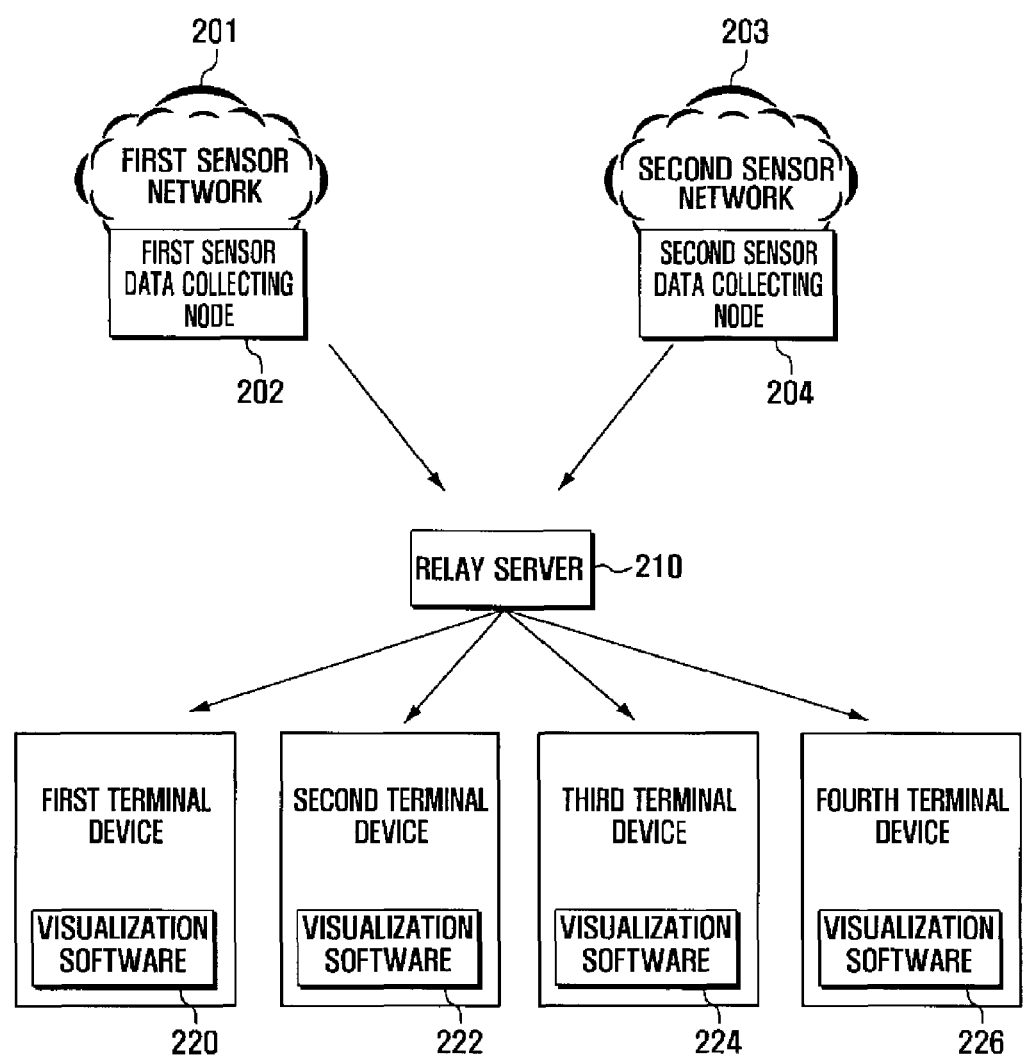
FIG. 2 is a block diagram illustrating a system to display information on sensor nodes of sensor networks according to an exemplary embodiment of the present invention.

FIG. 2 is a block diagram illustrating a system to display information on sensor nodes of sensor networks according to an exemplary embodiment of the present invention.

Referring to FIG. 2, a first sensor network 201 includes a sink node and many sensor nodes, and the system includes a first sensor data collecting node 202 that is connected to the sink node of the first sensor network 201 and collects information from the sensor nodes thereof.

A second sensor network 203 includes a sink node and many sensor nodes, and the system further includes a second sensor data collecting node 204 that is connected to the sink node of the second sensor network 203 and collects information from the sensor nodes thereof. A sensor data collecting node, like the first or second sensor data collecting node 202 or 204, is present at each sensor network and collects data from the sensor network, and has a sensor data collecting application. A sink node having the sensor data collecting application can act as a sensor data collecting node. The first and second sensor data collecting nodes 202 and 204 read packets from the corresponding sink nodes using the sensor data collecting application. The packets from the sink nodes include information regarding individual sensor nodes. The first and second sensor data collecting nodes 202 and 204 collect information regarding sensor nodes of their sensor networks, and send the collected information to a relay server 210 through, for example, Transmission Control Protocol/Internet Protocol (TCP/IP) sockets or wireless local area networks. The first and second sensor data collecting nodes 202 and 204 send configuration information of the sensor nodes from the corresponding sink nodes in a preset data format to the relay server 210.

The relay server 210 receives data from the first and second sensor data collecting nodes 202 and 204, extracts field data necessary for topology information display using a data processing program, and broadcasts the extracted field data at preset intervals. Terminal devices 220 to 226 connect to the relay server 210 if necessary, and receive the broadcast field data to visualize node information. Extraction of necessary field data from the received data is described in detail in connection with FIGS. 3 and 4.

Figure 4:
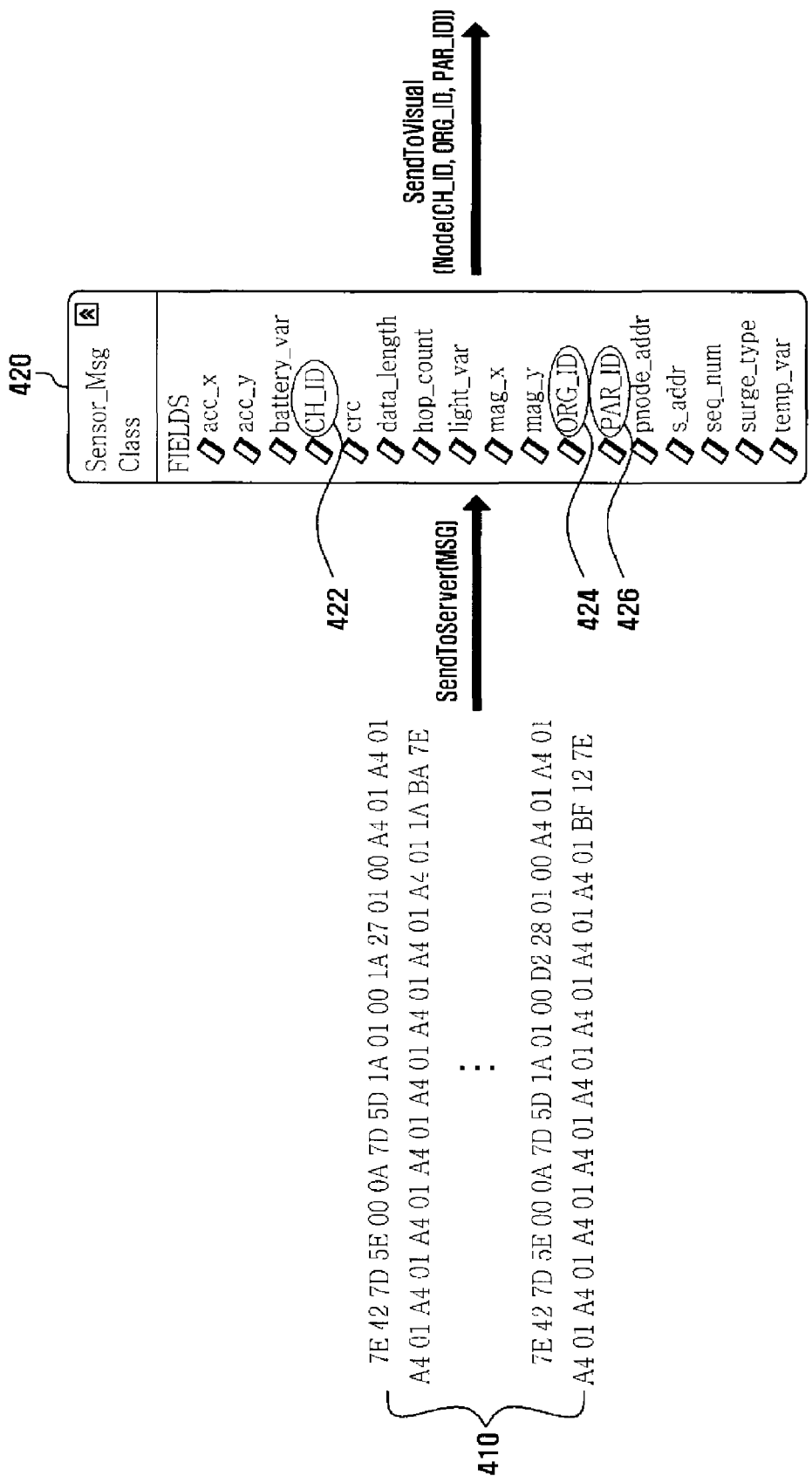
FIG. 4 illustrates an example of the extraction of Fields necessary for node information display in accordance with the principles of the present invention.

FIG. 3 illustrates an example of message filtering by the relay server 210, and FIG. 4 illustrates an example of extraction of field data for node information display.

When a message 410 containing sensor data (FIG. 4) from the sensor data collecting node 202 or 204 is received, the relay server 210 processes the received sensor data into data comprehensible to the user, as illustrated in FIG. 3. Thereafter, the relay server 210 extracts field values necessary for node information visualization from the processed data. Here, the fields necessary for node information visualization include three fields for cluster head identification (CH_ID) 422, originating node identification (ORG_ID) 424, and parent node identification (PAR_ID) 426. The relay server 210 broadcasts the extracted values of the CH_ID, ORG_ID and PAR_ID fields 422, 424 and 426 to the terminal devices.

The first to fourth terminal devices 220 to 226 receive node information broadcast by the relay server 210 if necessary, and visualize topology information using values present in the node information. This topic is described later.

Figure 5:
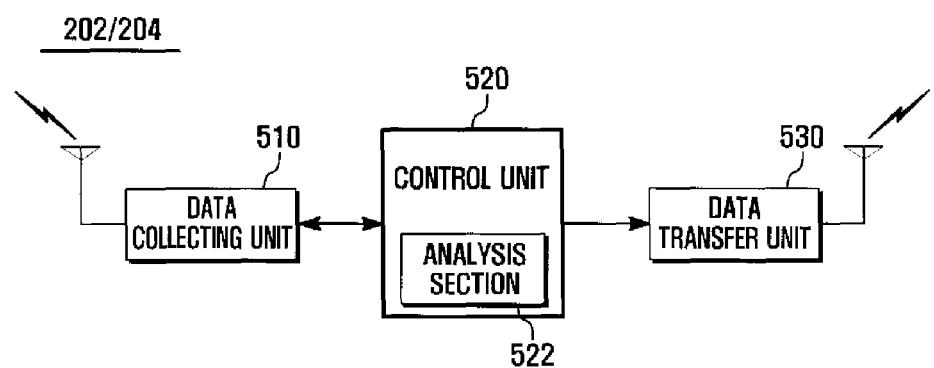
FIG. 5 is a block diagram illustrating an example of a sensor data collecting node of the system in FIG. 2.

FIG. 5 is a block diagram illustrating a sensor data collecting node of the system in FIG. 2.

Referring to FIG. 5, each of the sensor data collecting nodes 202 and 204 (shown in FIG. 2) may include a data collecting unit 510, control unit 520, and data transfer unit 530. The control unit 520 may include an analysis section 522. The data collecting unit 510 receives from the corresponding sink node, data such as temperature, illumination and humidity collected by sensor nodes, and node data. The sensor data collecting node may use short-range wireless communication compliant with international standards to receive data from the sink node. Under the control of the control unit 520, the collected data is packaged in the form of a class by the analysis section 522, and is sent to the data transfer unit 530. The control unit 520 controls the overall operation of the sensor data collecting node. Here, exemplary data is packaged in the form of a class as hexadecimal data, as illustrated in Table 1.

TABLE 1

7E 42 7D 5E 00 0A 7D 5D 1A 01 00 1A 27 01 00 A4 01 A4 01 A4 01 A4 01 A4 01 A4 01 A4 01 A4 01 A4 01 A4 01 1A BA 7E

.
.
.

7E 42 7D 5E 00 0A 7D 5D 1A 01 00 D2 28 01 00 A4 01 A4 01 A4 01 A4 01 A4 01 A4 01 A4 01 A4 01 A4 01 A4 01 BF 12 7E

The data transfer unit 530 sends the packaged data to the relay server 210. The data collecting unit 510 and data transfer unit 530 may be separate entities as in FIG. 5, or be formed as a single entity. The data collecting unit 510 and data transfer unit 530 may also include a transmitter for upconverting the frequency of a signal to be transmitted to the extent of a frequency range usable in the short range communication and amplifying the signal, and a receiver for low-noise amplifying a received signal and downconverting the frequency of the received signal.

Figure 6:
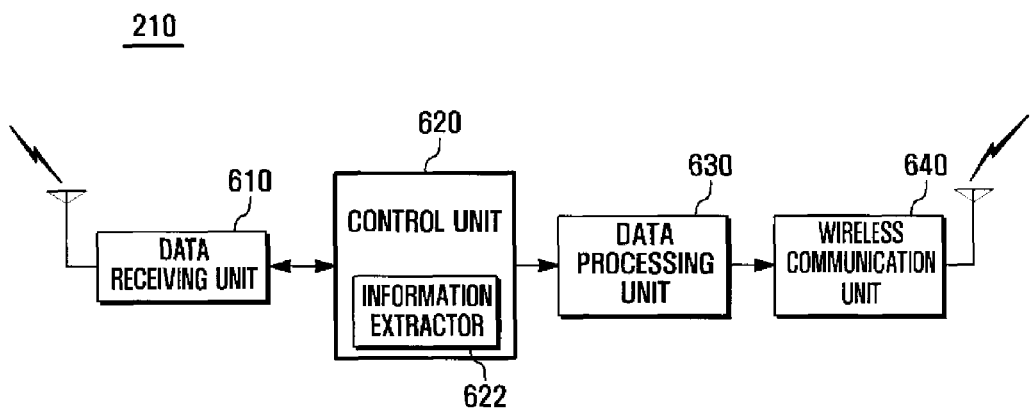
FIG. 6 is a block diagram illustrating an example of a relay server of the system in FIG. 2.

FIG. 6 is a block diagram illustrating the relay server 210.

Referring to FIG. 6, the relay server 210 may include a data receiving unit 610, a control unit 620, a data processing unit 630, and a wireless communication unit 640. The control unit 620 may include an information extractor 622. The data receiving unit 610 receives data from the sensor data collecting node 202 or 204. Under the control of the control unit 620, the received data is sent to the information extractor 622, which then extracts field values necessary for topology visualization from the received data, as illustrated in FIG. 4. The control unit 620 controls the overall operation of the relay server 210. A signal carrying the extracted field values may be broadcast by the data processing unit 630 and wireless communication unit 640 at preset intervals through a wireless Internet network or wireless local area network. The data processing unit 630 modulates and demodulates a signal under the control of the control unit 620, and thus may include a modulator/demodulator (modem) and a coder/decoder (codec). The data processing unit 630 and wireless communication unit 640 may be formed as separate entities as in FIG. 6, or may be formed as a single entity. The data processing unit 630 and wireless communication unit 640 may include a transmitter for upconverting the frequency of a signal to be transmitted to the extent of a frequency range usable in the local area communication or wireless Internet communication and amplifying the signal, and a receiver for low-noise amplifying a received signal and downconverting the frequency of the received signal.

Figure 7:
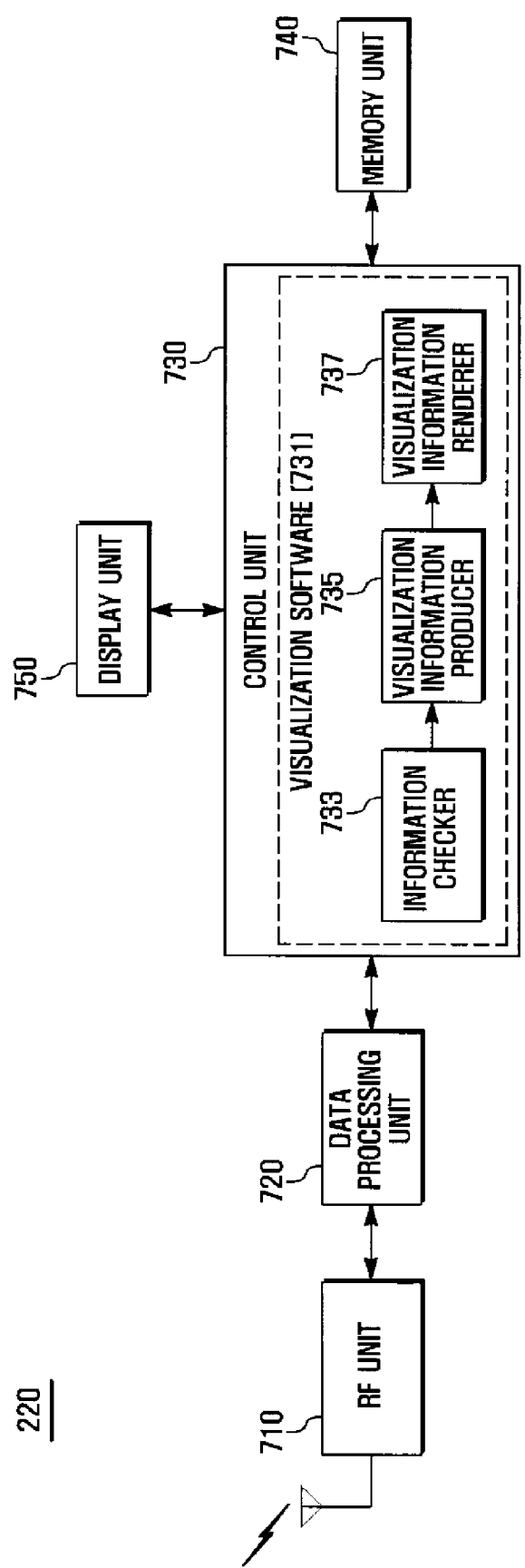
FIG. 7 is a block diagram illustrating an example of a terminal device of the system in FIG. 2.

FIG. 7 is a block diagram illustrating an example of a terminal device. The terminal device of FIG. 7 is one of the first to fourth terminal devices 220 to 226 in FIG. 2. The terminal device may include other elements according to intended functions in addition to the elements shown in FIG. 7.

Referring to FIG. 7, a radio frequency (RF) unit 710 performs wireless communication. In particular, if node information is needed, the RF unit 710 connects to the relay server 210 (FIG. 2) and receives a signal broadcast therefrom. The RF unit 710 may include an RF transmitter for upconverting the frequency of a signal to be transmitted and amplifying the signal, and an RF receiver for low-noise amplifying a received signal and downconverting the frequency of the received signal. A data processing unit 720 demodulates and decodes a received signal under the control of a control unit 730, and thus may include a modem and a codec.

The control unit 730 controls the overall operation of the terminal device, and may be formed to include the data processing unit 720. The control unit 730 may include visualization software 731. The visualization software 731 includes an information checker 733, visualization information producer 735, and visualization information renderer 737. The information checker 733 detects node information present in a received signal, and compares the detected node information with stored node information. The visualization information producer 735 produces visualization information necessary for visualizing nodes using node information. The visualization information renderer 737 visualizes nodes and links using visualization information.

A memory unit 740 may include a program memory section and data memory section. The program memory section stores programs to control normal operations of the terminal device. The data memory section stores useful data, and node information and visualization information in particular. A display unit 750 displays various menus, applications and contents related to the operation of the terminal device, and provides screens to input and output various data. In particular, the display unit 750 displays items of node information, i.e. topology information, on concentric circles.

Next, a procedure is described of displaying topology information on concentric circles using received node information.

Figure 8A:
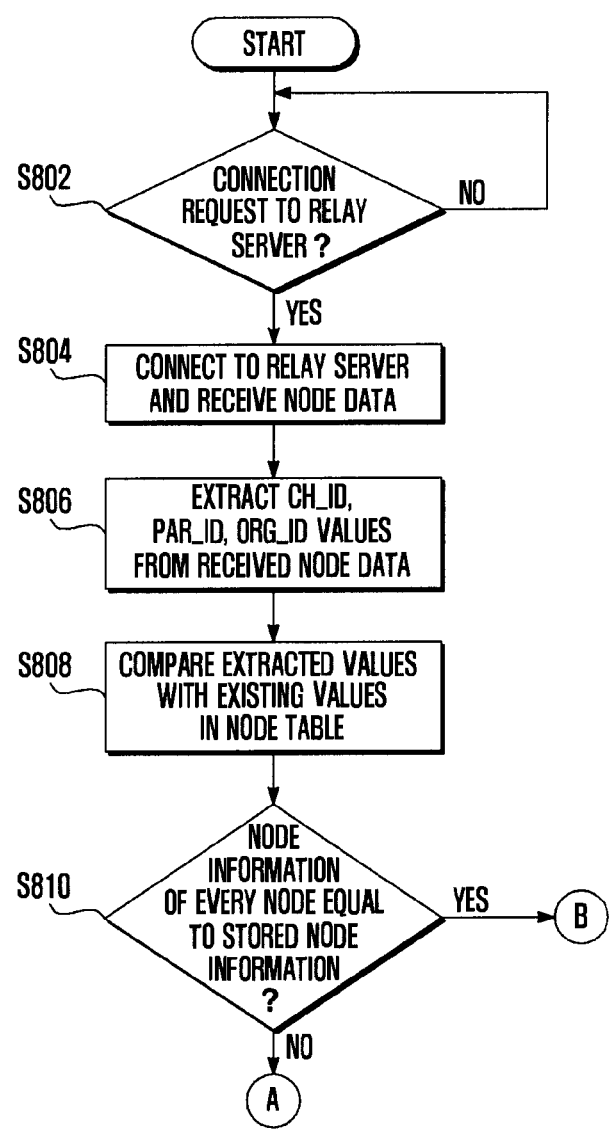
FIGS. 8A and 8B comprise a flow chart illustrating an exemplary procedure to display topology information on concentric circles according to another exemplary embodiment of the present invention.
Figure 8B:
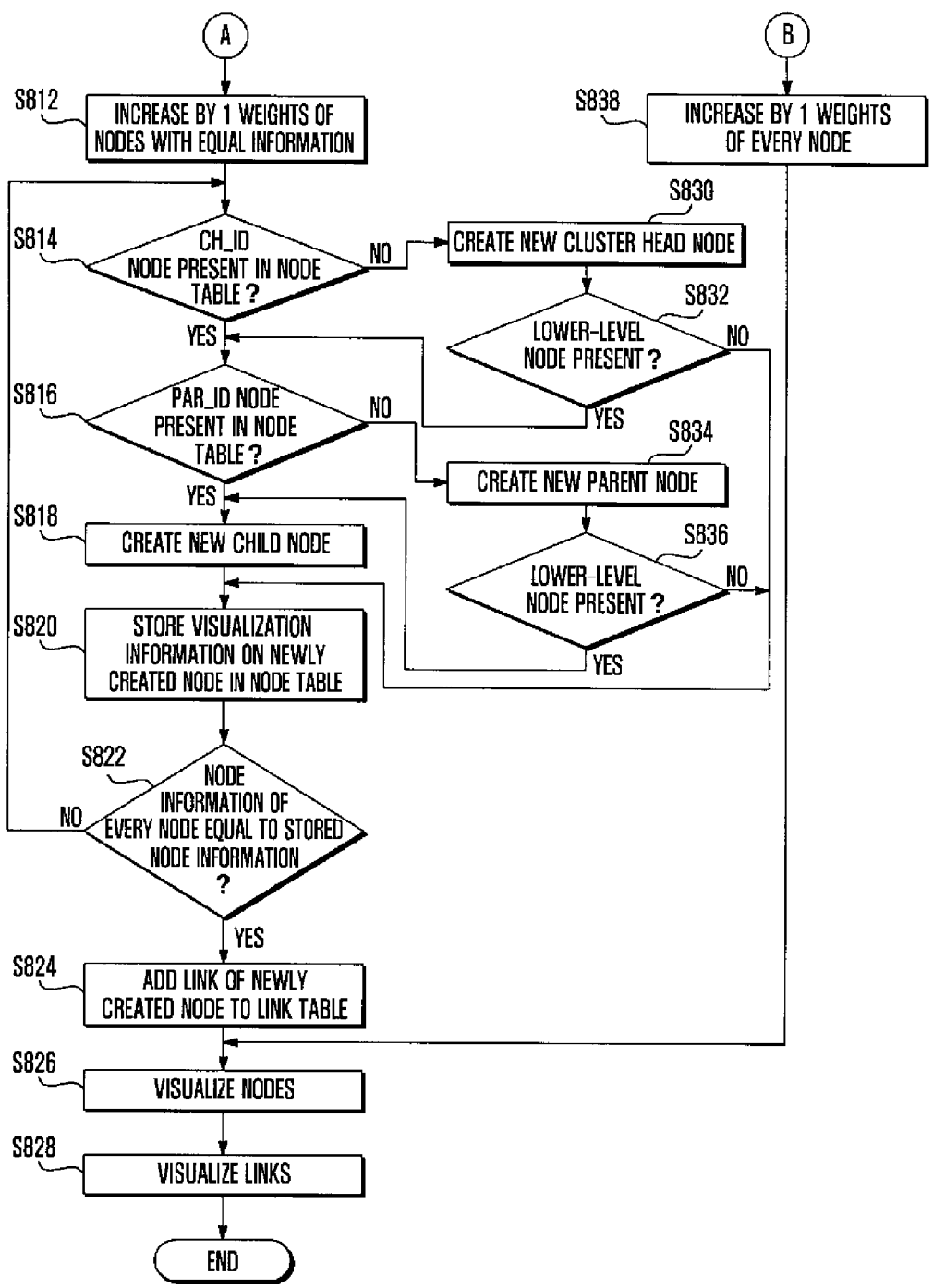

FIGS. 8A and 8B comprise a flow chart illustrating an exemplary procedure to display topology information on concentric circles according to another exemplary embodiment of the present invention.

Referring to FIG. 8A, the control unit 730 of a terminal device (FIG. 7) checks whether a request for connection to the relay server 210 (FIG. 2) is issued (S802). The control unit 730 determines that a connection request is issued when a preset command is input through an input unit (not shown) from the user to identify the cluster configuration, when the scheduled time arrives, or when a change occurs to a node. If a connection request is issued, the control unit 730 controls the RF unit 710 to connect to the relay server 210 and to receive node data broadcast therefrom (S804). The information checker 733 extracts node information (CH_ID, PAR_ID and ORG_ID) from the received node data (S806). Under the control of the control unit 730, the information checker 733 compares the received node information with existing node information stored in a node table (S808). The information checker 733 checks whether the received node information of every node is equal to the corresponding stored node information (S810). If the received node information of every node is equal to the corresponding stored node information, the control unit 730 increases by 1 the 'Weight' value of each node in the node table like Table 2 (S838 in FIG. 8B), or otherwise proceeds to step S812 (shown in FIG. 8B). Table 2 illustrates a node table, and is described in more detail later.

TABLE 2

| ID | PAR_ID | CH_ID | Level (r) | Basis Angle | Theta | Percent_X | Percent_Y | Loc_X | Loc_Y | Weight |
|---|---|---|---|---|---|---|---|---|---|---|
| 1 | 1 | 1 | 1 | 0 | 0 | 50 | 50 | 250 | 200 | 15 |
| 2 | 1 | 1 | 2 | 0 | 90 | 50 | 40 | 250 | 180 | 7 |
| 3 | 1 | 1 | 2 | 0 | 270 | 50 | 60 | 250 | 220 | 6 |
| 4 | 2 | 1 | 3 | 90 | 120 | 60 | 40 | 200 | 160 | 3 |
| 5 | 3 | 1 | 3 | 270 | 240 | 60 | 60 | 200 | 240 | 2 |
| 6 | 3 | 1 | 3 | 270 | 360 | 40 | 40 | 300 | 240 | 1 |
| ... | ... | ... | ... | ... | ... | ... | ... | ... | ... | ... |

The control unit 730 increases by 1 the 'Weight' value of each node whose received node information is equal to the corresponding stored node information (S812). For a node whose received node information is not equal to the corresponding stored node information, the information checker 733 checks whether the 'CH_ID' value of the node is present in the node table (S814). If the 'CH_ID' value is present in the node table, the control unit 730 proceeds to step S816. If the 'CH_ID' value is not present in the node table, the control unit 730 creates a new cluster head node (S830), and the information checker 733 checks whether information regarding a lower-level node of the cluster head node is present in the received node information (S832). If information regarding a lower-level node is present, the control unit 730 proceeds to step S816, or otherwise proceeds to step S820. The information checker 733 checks whether the 'PAR_ID' value of the node is present in the node table (S816). If the 'PAR_ID' value of the node is present in the node table, the control unit 730 proceeds to step S818. If the 'PAR_ID' value of the node is not present in the node table, the control unit 730 creates a new parent node (S834), and the information checker 733 checks whether information on a lower-level node of the parent node is present in the received node information (S836). If information on a lower-level node is present, the control unit 730 proceeds to step S818, or otherwise proceeds to step S820. Thereafter, the control unit 730 creates a new child node with a label 'ORG_ID' (S818). Under the control of the control unit 730, the visualization information producer 735 produces visualization information regarding the newly created node and stores the produced visualization information in the node table (S820). Production of visualization information using received node information (CH_ID, PAR_ID and ORG_ID) is described in connection with FIGS. 9A and 9B.

Figure 9A:
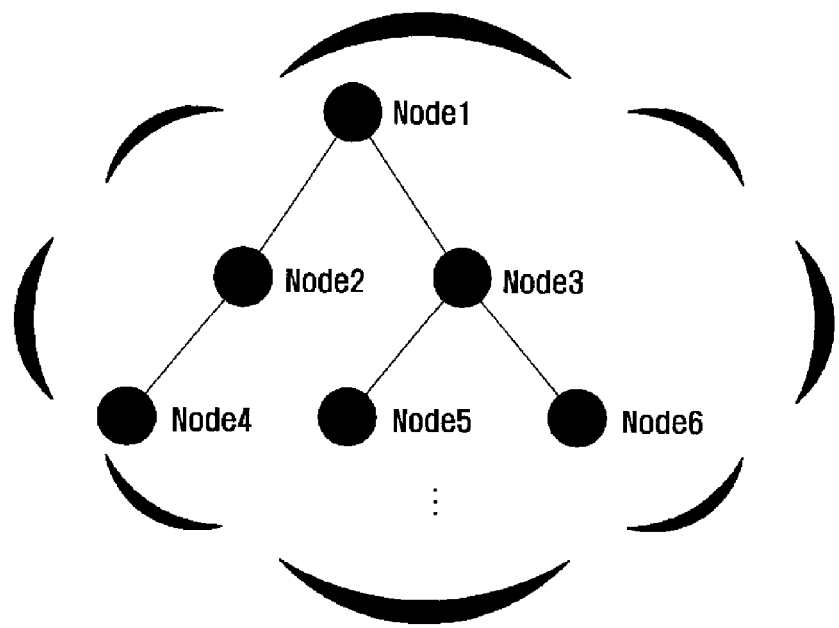
FIG. 9A illustrates an exemplary topological structure of a wireless sensor network.
Figure 9B:
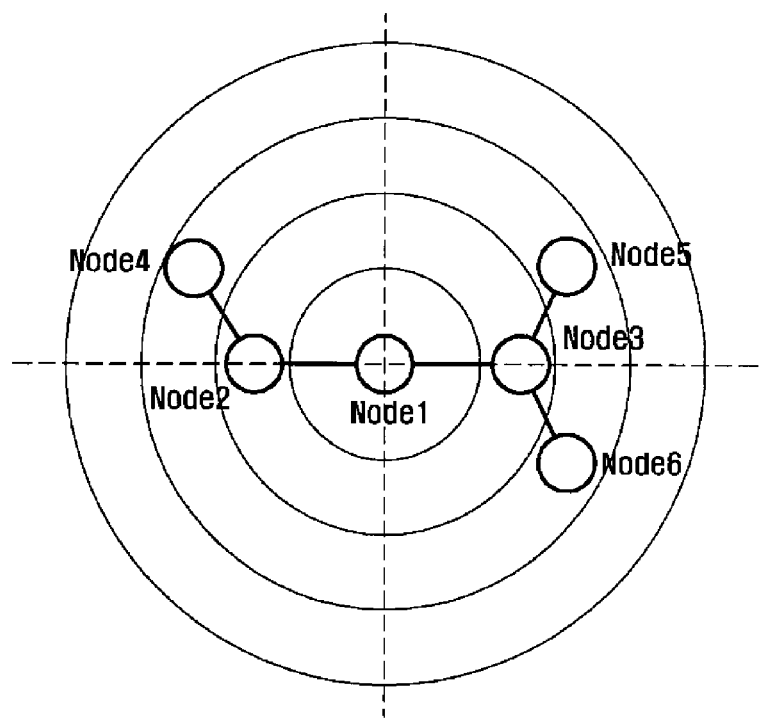
FIG. 9B illustrates an exemplary visualization of the topological structure of FIG. 9A on concentric circles in accordance with the principles of the present invention.

FIG. 9A illustrates a topological structure of a wireless sensor network, and FIG. 9B illustrates visualization of the topological structure of FIG. 9A on concentric circles.

Referring to FIGS. 9A and 9B, a node Node1 is the cluster head being the center of a cluster. The cluster head is arranged at the center of the concentric circles, as illustrated in 9B. Nodes Node2 and Node3, lower-level nodes of the node Node1, are arranged on the second circle from the center. Nodes Node4 to Node6, lower-level nodes of the node Node2 or Node3, are arranged on the third circle. Visualization information of Table 2 is necessary to visualize a network having a configuration shown in FIG. 9A in a manner shown in FIG. 9B for easy viewing.

Figure 1A:
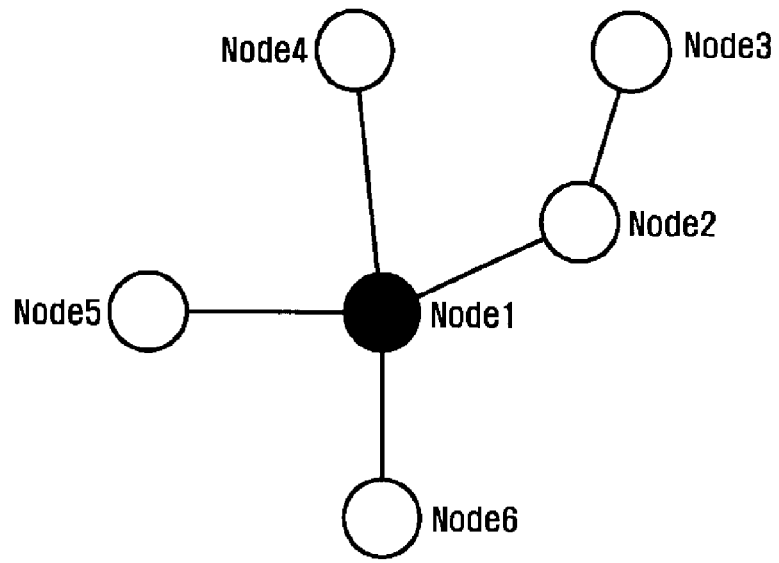
FIGS. 1A and 1B are diagrams illustrating various topologies of sensor networks.
Figure 1B:
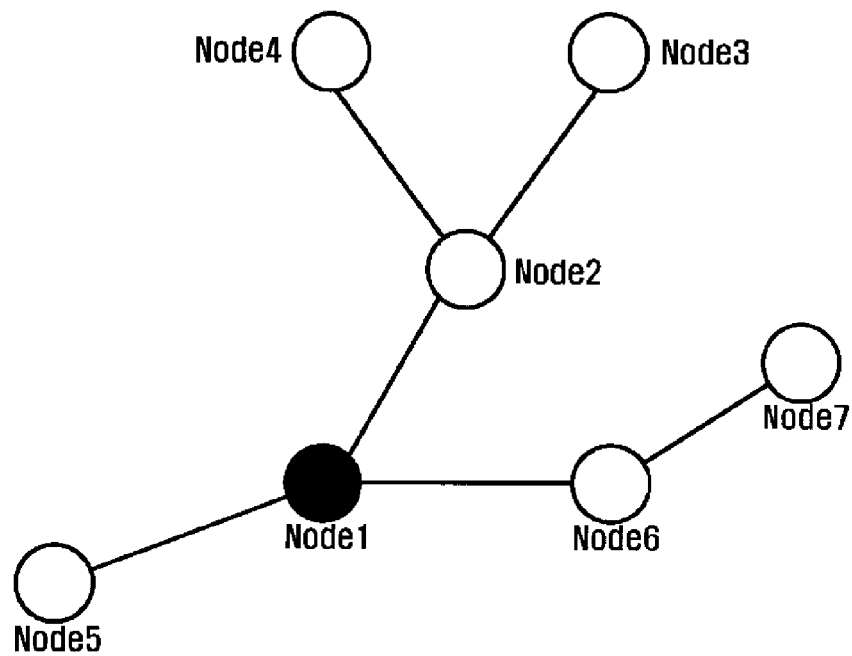

In Table 2, 'ORG_ID' denotes the original ID of a node, 'PAR_ID' denotes the ID of a parent node, and CH_ID denotes the ID of the head node of a cluster. 'Level(r)' denotes the depth of a node, i.e., the distance in hops from the sink node ('r' is the radial coordinate in the polar coordinate system). For example, in FIG. 1, the hop counts of the nodes Node1, Node2, Node4, Node5, Node 6, and Node 3 are 1, 2, 2, 2, 2, and 3, respectively. 'BasisAngle' denotes a reference angle to draw lower-level nodes in a polar coordinate system, and 'Theta' denotes the polar angle θ. For effective visualization of links by preventing overlapped display of multiple nodes, the 'BasisAngle' value of a node is set to the 'Theta' value of the higher-level node. 'Percent_X' and 'Percent_Y' denote a relative x-axis value and y-axis value (percent) on the screen of the display unit where the left end of the horizontal x-axis is assumed 0 and the right end is assumed 100, and the upper end of the vertical y-axis is assumed 0 and the lower end is assumed 100. The 'Percent_X' and 'Percent_Y' values are used to adjust gaps between visualized nodes with the increasing number of nodes. 'Loc_X' and 'Loc_Y' denote real x, y coordinates of a node on the screen, and are used to display nodes on the real-size screen. 'Weight' denotes a weight of a node.

In FIG. 9B, the node Node1 is the cluster head, and thus the CH_ID, PAR_ID and ORG_ID values thereof are all 1. Because the node Node1 is at the center of the concentric circles, the hop count is 1 ('Level(r)'=1) and 'BasisAngle' and 'Theta' values are all 0. Because the node Node1 is at the center, the 'Percent_X' and 'Percent_Y' values are all 50 and the 'Loc_X' and 'Loc_Y' values are 250 and 200 in the case of a real 500:400(X:Y) screen. The 'Weight' value thereof is assumed 15 in consideration of frequent occurrences. The node Node2 has an 'ORG_ID' value of 2, has a 'CH_ID' value of 1 as it belongs to the cluster headed by the node Node1, and has a 'PAR_ID' value of 1 as a child node of the node Node1. The node Node2 has a 'Level(r)' value of 2 because it is arranged on the second circle from the center, and has a 'BasisAngle' value of 0, the same as the 'Theta' value of the parent node. The node Node2 is assumed to have a 'Theta' value of 90, a 90 degrees difference from the parent node. The node Node2 is on the same x-axis as the node Node1, and thus has a 'Percent_X' value of 50 and a 'Loc_X' value of 250. The node Node2 is arranged on the second circle. Hence, the node Node2 has a 'Percent_Y' value of 40 with a gap of 10, and has a 'Loc_X' value of 180 with a difference of 20 between concentric circles. The 'Weight' value is assumed 7.

Similarly to the node Node2, the node Node3 has an 'ORG_ID' value of 3, a 'CH_ID' value of 1 as a lower-level node of the cluster head node Node1, and a 'PAR_ID' value of 1 as a child of the node Node1. The node Node3 has a 'Level(r)' value of 2 because it is arranged on the second circle from the center, and has a 'BasisAngle' value of 0, the same as the 'Theta' value of the parent node. The node Node3 is assumed to have a 'Theta' value of 270 so as to keep a 180 degrees difference from the node Node2 arranged on the same circle.

In the present embodiment, the 'Theta' values of nodes arranged on the same circle are determined through dividing 360 degrees by the number of nodes on the same circle. The node Node3 is on the same x-axis as the node Node1, and thus has a 'Percent_X' value of 50 and a 'Loc_X' value of 250. The node Node3 is arranged on the second circle. Hence, the node Node3 has a 'Percent_Y' value of 60 with a gap of 10, and has a 'Loc_X' value of 220 with a difference of 20 between concentric circles. The 'Weight' value is assumed 6. Next, the node Node4 has an 'ORG_ID' value of 4, a 'CH_ID' value of 1 as a lower-level node of the cluster head node Node1, and a 'PAR_ID' value of 2 as a child of the node Node2. The node Node4 has a 'Level(r)' value of 3 because it is a child of the node Node2 arranged on the second circle. The node Node4 has a 'BasisAngle' value of 90, the same as the 'Theta' value of the parent node Node2. The node Node4 has a 'Theta' value of 120 obtained through dividing 360 degrees by 3 (the number of nodes on the same circle). These three nodes have the same 'Theta' value of 120. The node Node4 is somewhat in the right-hand side of the node Node1 relative to the x-axis, and thus has a 'Percent_X' value of 60 and a 'Loc_X' value of 200. The node Node4 is in the upper side of the node Node1 relative to the y-axis, and thus has a 'Percent_Y' value of 40 and a 'Loc_Y' value of 160. The gap between nodes is adjusted with the increasing number of nodes present on the same circle. Hence, when a change occurs in the node table, the visualization information producer 735 examines possible changes in the 'Percent_X', 'Percent_Y', 'Loc_X', and 'Loc_Y' values of existing nodes, and updates the values if necessary. The node Node4 is assumed to have a 'Weight' value of 3. Similarly to the nodes Node1 to Node4, the values in Table 2 are computed for the nodes Node5 and Node6. Under the control of the control unit 730, the visualization information producer 735 computes the values in Table 2. Further, to visualize a node on the screen, the visualization information producer 735 transforms polar coordinates of a 'Level(r)' value (hop count) and a 'Theta' value to rectangular coordinates, as described below.

Figure 10A:
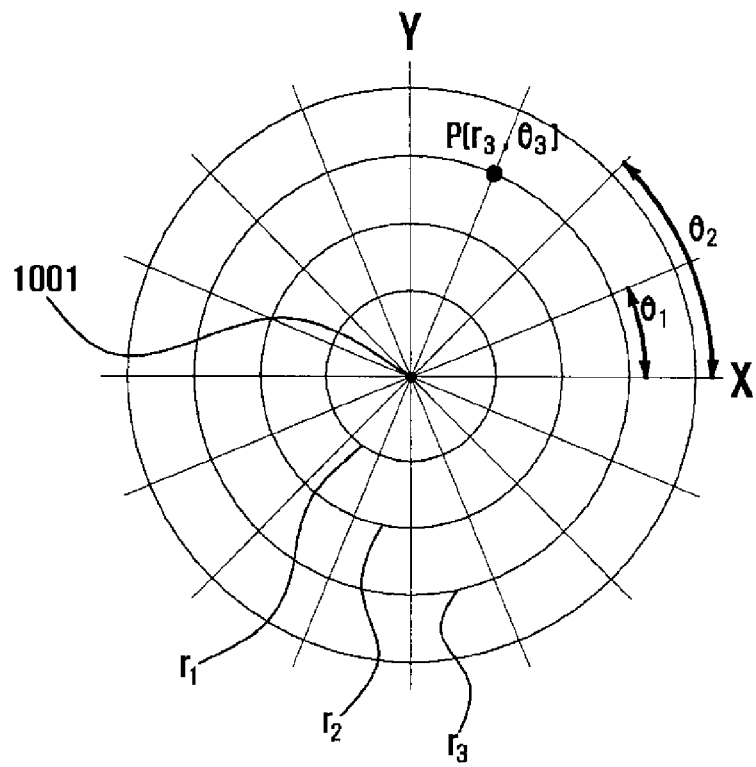
FIG. 10A illustrates exemplary coordinate systems on concentric circles.
Figure 10B:
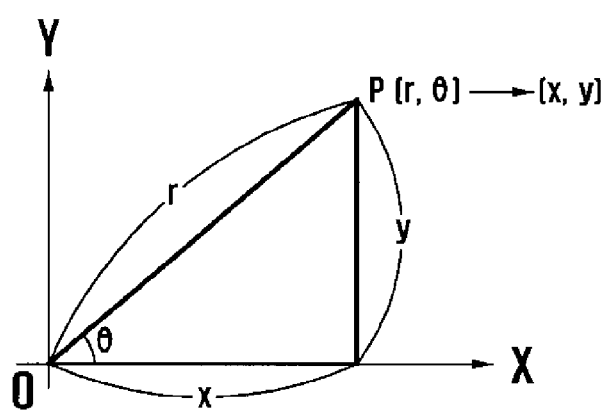
FIG. 10B illustrates examples of coordinate transformation from the polar coordinate system to the rectangular coordinate system.

FIG. 10A illustrates coordinate systems on concentric circles, and FIG. 10B illustrates coordinate transformation from the polar coordinate system to the rectangular coordinate system.

Referring to FIG. 10A, the center 1001 of the concentric circles has a 'Level(r)' of 0 and a 'Theta' value of 0 in Table 2. Concentric circles are referred to as $r_1, r_2, r_3 \ldots$ from the center, and correspond to hop counts. 'Theta' values are referred to as $\theta_1, \theta_1, \theta_3$ counterclockwise from the x-axis, and are obtained through dividing 360 by the number of nodes on the same concentric circle. It is assumed that 15 nodes are present in FIG. 10A. The polar coordinates of the point P in FIG. 10A can be represented by $(r_3, \theta_3)$. Values of $r_1, r_2,$ and $r_3$ respectively correspond to 2, 3, and 4 in Table 2. Values of $\theta_1, \theta_2$ and $\theta_3$ are determined through dividing 360 by 15, and thus are 24, 48 and 72. As illustrated In FIG. 10B, a point P on a plane can be represented by polar coordinates and rectangular coordinates. When a directed line OX emanating from a point O on a plane is defined as in FIG. 10B, the coordinates of P can be represented by the length of OP (r) and the angle XOP ($\theta$). That is, in the polar coordinate system, the polar coordinates of a point P on a plane are represented by an ordered pair of real numbers (r, $\theta$). The point O is referred to as the pole, the directed line OX is referred to as the initial line, and $\theta$ is in radians. A point P on a plane can be represented by polar coordinates(r, $\theta$) and rectangular coordinates (x, y). The rectangular coordinates (x, y) on the screen of the display unit 750 can be computed from the polar coordinates (r, $\theta$) using Equation 1.

$$x = r \cos\theta \quad y = r \sin\theta \qquad \text{[Equation 1]}$$

Accordingly, for a node, the use of the number of hops (r) of the node and a value ('Theta') by division of 360 (circumference) by the number of nodes having the same hop count, and computation of the corresponding rectangular coordinates (x, y) using Equation 1 enable display of the node on the display unit 750.

Referring back to FIG. 8B, after production and storage of computed values for the newly created node, the control unit 730 checks whether the received node information of every node is equal to currently stored node information (S822). If the received node information of every node is equal to currently stored node information, the control unit 730 proceeds to step S824, or otherwise returns to step 814 for continued value production of a node whose received node information is not equal to the corresponding stored node information. Under the control of the control unit 730, the visualization information producer 735 adds link information of the newly created node to a link table that stores information on links connecting two nodes (S824). Link information may be created by an expression "From=ORG_ID, To=PAR_ID, New Link (From, To)" indicating a link from an 'ORG_ID' node to a 'PAR_ID' node.

Under the control of the control unit 730, the visualization information renderer 737 visualizes nodes using information in the node table like Table 2 (S826). That is, nodes are represented on concentric circles as in FIG. 9B, and displayed on the display unit 750. The visualization information renderer 737 visualizes links connecting nodes together on the display unit 750 using the link table (S828). Accordingly, topology information of a sensor network can be readily recognized from nodes visualized on concentric circles. When a node is added, new node information can be automatically visualized through automatic adjustment of gaps between nodes on concentric circles without user intervention.

Figure 11:
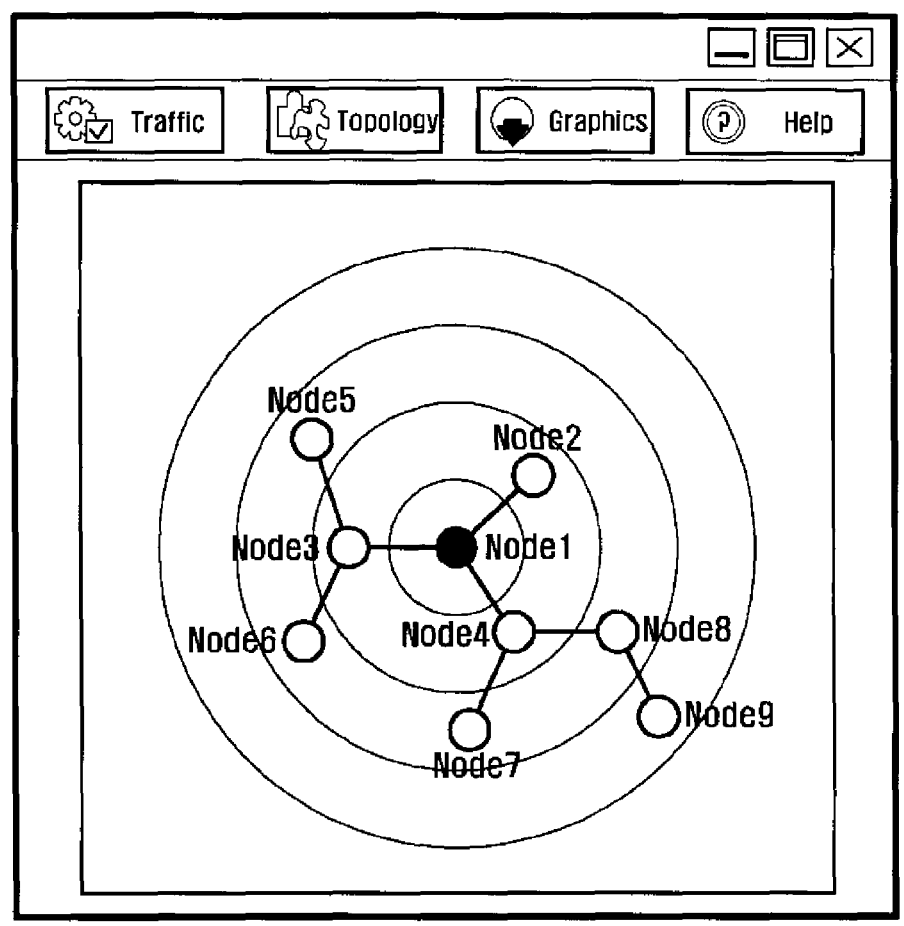
FIG. 11 illustrates the display of exemplary topology information on concentric circles in accordance with the principles of the present invention.

FIG. 11 illustrates display of topology information on concentric circles.

Referring now to FIG. 11, a node Node1 is the cluster head node; nodes Node2, Node3 and Node4 are lower-level nodes of the node Node1 having a hop count of 2; nodes Node5, Node6, Node7 and Node8 are lower-level nodes of the nodes Node3 and Node4 having a hop count of 3; and a node Node9 is a lower-level node of the node Node8 having a hop count of 4. That is, the node Node1 is at the center of the concentric circles; the nodes Node2, Node3 and Node4 with a hop count of 2 are on the first circle from the center; nodes Node5, Node6, Node7 and Node8 with a hop count of 3 are on the second circle; and the node Node9 with a hop count of 4 is on the third circle. Thereby, topology information can be easily recognized. Upon addition of a node, gaps between nodes having the same hop count arranged on the same circle are adjusted, thereby enabling topology information update without user intervention. The topology can be displayed, printed, emailed output in any of a various number of ways for a user for automatic display, or for display upon a user request (such as by a network administrator) and/or stored in a memory that can be viewed upon demand. There can also be a message provided to a user that an updated topology is available for display. It should also be understood that radians could be used instead of degrees.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A method of displaying topology information of a sensor network having a plurality of sensor nodes, comprising:
   receiving node information collected and extracted from a plurality of sensor nodes;
   comparing the received node information with previously stored node information;
   computing, when the received node information is unequal to the stored node information, visualization information regarding a sensor node of said plurality of sensor nodes whose information is included in the received node information and is not present in the previously stored node information;
   providing an output for display of sensor nodes on concentric circles using the visualization information; and
   displaying the plurality of sensor nodes on concentric circles using the visualization information on a display, wherein the displaying comprises arranging a cluster node at a center of the concentric circles and arranging an originating node and a parent node of the originating node respectively on an outer one and an inner one of two consecutive concentric circles.

2. The method of claim 1, further comprising sending a designated recipient a message that an updated topology is available for display.

3. The method of claim 1, wherein the node information comprises an identifier of a cluster head node (CH_ID), an identifier of an originating node (ORG_ID), and an identifier of a parent node of the originating node (PAR_ID).

4. The method of claim 1, wherein the visualization information comprises the node information, a hop count r, and an angle $\theta$ in which hop count r comprises an integer count of concentric circles from a starting point, and angle $\theta$ is represented in degrees or radians, wherein angle $\theta$ in degrees is obtained by dividing a 360 degree circumference by a number of sensor nodes having a same hop count r.

5. The method of claim 4, wherein the hop count comprises a number of hops from the cluster head node and corresponds to one of the concentric circles of the visualization information.

6. The method of claim 5, wherein the cluster head node is arranged at a center of the concentric circles, and an originating node and a parent node of the originating node are arranged respectively on an outer one and an inner one of two consecutive concentric circles.

7. The method of claim 4, wherein the angle θ is obtained through dividing a 360 degree circumference by a number of sensor nodes having the same hop count r.

8. The method of claim 4, further comprising converting polar coordinates comprising the hop count r and angle θ into rectangular coordinates (x, y) on a screen of a display unit displaying the visualization information with a horizontal x-axis and vertical y-axis using the following equation:

$$x = r \cos\theta \quad y = r \sin\theta.$$

9. The method of claim 4, wherein the visualization information comprises a 'BasisAngle' value for preventing overlapped visualization of multiple nodes, and a value for adjusting gaps between visualized nodes with an increasing number of nodes.

10. An apparatus for displaying topology information of a sensor network having a plurality of sensor nodes, comprising:
 a wireless unit for receiving node information collected and extracted from a plurality of sensor nodes;
 a checking unit for comparing the received node information with previously stored node information;
 a calculating unit for computing, when the received node information is unequal to the previously stored node information, visualization information regarding a sensor node of the plurality of sensor nodes whose information is included in the received node information and is not present in the previously stored node information; and
 output means for providing an output of the visualization information for visual display,
 wherein the output means comprises a rendering unit for displaying the sensor nodes on concentric circles using the visualization information,
 the rendering unit display a cluster node at a center of the concentric circles and an originating node and a parent node of the originating node respectively on an outer one and an inner one of two consecutive concentric circles.

11. The apparatus of claim 10, wherein the node information comprises an identifier of a cluster head node (CH_ID), an identifier of an originating node (ORG_ID), and an identifier of a parent node of the originating node (PAR_ID).

12. The apparatus of claim 10, wherein the visualization information comprises the node information, a hop count r, and an angle θ, in which hop count r comprises an integer count of concentric circles from a starting point, and angle θ is represented in degrees or radians, wherein angle θ in degrees is obtained by dividing a 360 degree circumference by a number of sensor nodes having a same hop count r.

13. The apparatus of claim 12, wherein the hop count r comprises a number of hops from the cluster head node and corresponds to one of the concentric circles.

14. The apparatus of claim 12, wherein the angle θ is obtained by dividing a 360 degree circumference by a number of sensor nodes having the same hop count r.

15. The apparatus of claim 12, wherein the calculating unit converts polar coordinates comprising hop count r and angle θ into rectangular coordinates (x, y) on a screen of a display unit with a horizontal x-axis and vertical y-axis using the following equation:

$$x = r \cos\theta \quad y = r \sin\theta.$$

16. The apparatus of claim 10, further comprising a memory unit to store the node information and visualization information.

17. The apparatus of claim 10, wherein the visualization information comprises a 'BasisAngle' value for preventing overlapped visualization of multiple nodes, and a value for adjusting gaps between visualized nodes with an increasing number of sensor nodes.

18. A system of displaying topology information of a sensor network having a plurality of sensor nodes, comprising:
 a data collecting node for collecting sensing data from a plurality of the sensor nodes and for transmitting the collected sensing data;
 a relay server for receiving the sensing data from the data collecting node, for extracting node information from the received sensing data, and for broadcasting the extracted node information; and
 one or more terminal devices, each terminal device receiving the extracted node information broadcast from the relay server, for computing visualization information of the sensor nodes, and for displaying the sensor nodes on concentric circles using the visualization information, wherein the terminal devices display a cluster node at a center of the concentric circles and an originating node and a parent node of the originating node respectively on an outer one and an inner one of two consecutive concentric circles.

19. The system of claim 18, wherein the sensing data comprises sensed data related to temperature, illumination and humidity, and an upper-level node identifier.

20. The system of claim 19, wherein the relay server extracts node information including an identifier of a cluster head node (CH_ID), an identifier of an originating node (ORG_ID), and an identifier of a parent node of the originating node (PAR_ID) from the sensing data, and broadcasts the extracted node information.

21. The system of claim 18, wherein each terminal device computes visualization information including a hop count r and an angle θ using the node information in which hop count r comprises an integer count of concentric circles from a starting point, and angle θ is represented in degrees or radians, wherein angle θ in degrees is obtained by dividing a 360 degree circumference by a number of sensor nodes having a same hop count r.

22. The system of claim 21, wherein the hop count r comprises a number of hops from the cluster head node and corresponds to one of the concentric circles, and the angle θ is obtained by dividing a 360 degree circumference by a number of nodes having the same hop count r.

23. The system of claim 22, wherein each terminal device converts polar coordinates comprising hop count r and angle θ into rectangular coordinates (x, y) on a screen of a display unit with a horizontal x-axis and vertical y-axis using the following equation:

$$x = r \cos\theta \quad y = r \sin\theta.$$

24. The system of claim 18, wherein the visualization information comprises a 'BasisAngle' value for preventing overlapped visualization of multiple nodes, and a value for adjusting gaps between visualized nodes with an increasing number of nodes.

* * * * *